US008830073B2

(12) United States Patent
Sims et al.

(10) Patent No.: US 8,830,073 B2
(45) Date of Patent: Sep. 9, 2014

(54) POWER CONVERTER WITH REDUCED POWER CONSUMPTION WHEN TOGGLING BETWEEN SLEEP AND NORMAL MODES DURING DEVICE CHARGING

(75) Inventors: Nicholas A. Sims, San Francisco, CA (US); Jeffrey J. Terlizzi, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 648 days.

(21) Appl. No.: 12/628,976

(22) Filed: Dec. 1, 2009

(65) Prior Publication Data

US 2011/0128153 A1   Jun. 2, 2011

(51) Int. Cl.
*G08B 21/00* (2006.01)

(52) U.S. Cl.
USPC ........ 340/635; 340/636.2; 320/162; 320/107; 323/282; 323/285; 713/320; 713/340

(58) Field of Classification Search
USPC ...................... 340/636.1, 636.2, 636.17, 635; 307/112, 66, 43, 80; 320/162, 107; 323/282, 285, 351; 713/107, 320, 340
See application file for complete search history.

(56) References Cited

U.S. PATENT DOCUMENTS

| | | | |
|---|---|---|---|
| 5,612,609 A | 3/1997 | Choi | |
| 5,642,267 A | 6/1997 | Brkovic et al. | |
| 5,657,257 A | 8/1997 | Lee | |
| 5,737,706 A | 4/1998 | Seazholtz et al. | |
| 6,215,288 B1 | 4/2001 | Ramsey et al. | |
| 7,030,596 B1 | 4/2006 | Salerno et al. | |
| 7,956,591 B2 | 6/2011 | Terlizzi et al. | |
| 8,164,932 B2 | 4/2012 | Sims et al. | |
| 8,169,806 B2 | 5/2012 | Sims et al. | |
| 8,575,917 B2 | 11/2013 | Sims et al. | |
| 2002/0023235 A1* | 2/2002 | Odaohhara | 713/320 |
| 2006/0186867 A1* | 8/2006 | Kataoka | 323/282 |
| 2008/0290731 A1* | 11/2008 | Cassidy | 307/35 |
| 2009/0278700 A1* | 11/2009 | Marriott et al. | 340/636.1 |
| 2011/0068626 A1 | 3/2011 | Terlizzi et al. | |

FOREIGN PATENT DOCUMENTS

WO   9926330   5/1999

OTHER PUBLICATIONS

Terlizzi et al., U.S. Appl. No. 12/239,345, filed Sep. 26, 2008.
Sims et al., U.S. Appl. No. 12/370,488, filed Feb. 12, 2009.
Sims et al., U.S. Appl. No. 12/370,507, filed Feb. 12, 2009.
Terlizzi et al., U.S. Appl. No. 12/566,594, filed Sep. 24, 2009.

(Continued)

*Primary Examiner* — Steven Lim
*Assistant Examiner* — Hongmin Fan
(74) *Attorney, Agent, or Firm* — Womble Carlyle Sandridge & Rice, LLP

(57) ABSTRACT

Electronic devices may have batteries that power internal circuitry. A power converter may connect to an input-output port in an electronic device to deliver power to the electronic device. Battery charging circuitry in the electronic device may be used to charge the battery in an electronic device while power is delivered from the power converter. The power converter may have load detection circuitry. When an output load is present, the power converter operates in an active mode and delivers power to the electronic device. When the output load is not present, the power converter enters a low-power standby mode. The electronic device has switching circuitry that periodically either electrically couples or electrically isolates the input-output port from internal circuitry. When the input-output port is isolated, the power converter senses that no output load is present and enters the standby state to conserve power.

20 Claims, 5 Drawing Sheets

(56) References Cited

OTHER PUBLICATIONS

Sims et al., U.S. Appl. No. 12/566,593, filed Sep. 24, 2009.
KR-20127017049. Office Action mailed Sep. 24, 2013.
PCT/US2010/056875. Int'l Search Report-Written Opinion (Jun. 7, 2011).

\* cited by examiner

POWER CONVERTER WITH REDUCED POWER CONSUMPTION WHEN TOGGLING BETWEEN SLEEP AND NORMAL MODES DURING DEVICE CHARGING

BACKGROUND

This relates to systems in which power converters are used to charge electronic devices, and more particularly, to systems in which power converters and electronic devices cooperate to ensure that the power converters can enter a low power sleep mode whenever possible to reduce power consumption.

Power converter circuitry can be used to convert alternating current (AC) power into direct current (DC) power. AC power is typically supplied from wall outlets and is sometimes referred to as line power. Electronic devices include circuitry that runs from DC power. The DC power that is created by an AC-to-DC power converter may be used to power an electronic device. The DC power that is created may also be used to charge a battery in an electronic device.

In some applications, AC to DC power converter circuitry may be incorporated into an electronic device. For example, desktop computers often include AC to DC power converter circuitry in the form of computer power supply units. A computer power supply unit has a socket that receives an AC power cord. With this type of arrangement, the AC power cord may be plugged directly into the rear of the computer to supply AC power without using an external power converter.

Although desktop computers are large enough to accommodate internal power supplies, other devices such as handheld electronic devices and portable computers are not. As a result, typical handheld electronic devices and laptop computers require the use of external power converters. When disconnected from the power converter, a handheld electronic device or portable computer may be powered by an internal battery. When AC line power is available, the power converter is used to convert AC power into DC power for the electronic device.

Compact AC-DC power converter designs are typically based on switched-mode power supply architectures. Switched-mode power converters contain switches such as transistor-based switches that work in conjunction with energy storage components such as inductive and capacitive elements to regulate the production of DC power from an AC source. A feedback path may be used to tap into the converter output and thereby ensure that a desired DC voltage level is produced under varying loads.

High power converter efficiency is desirable for conserving power. High power conversion efficiency can be obtained by using efficient converter topologies and low-loss parts. Even when an optimal design is used, however, there are residual power losses when operating a power converter. These residual losses are associated with leakage currents and other parasitic effects that arise from running the switched-mode circuitry of the converter and lead to the consumption of power by the power converter even when the power converter is not being used to supply significant amounts of power to an electronic device. Although a user who desires to minimize power losses could manually disconnect a power converter from AC line power when not in use, this type of manual approach is burdensome on the user.

It would therefore be desirable to provide a power converter and electronic device that are able to cooperate with each other in a way that allows power consumption to be minimized without burdening a user.

SUMMARY

In an environment in which an electronic device has a battery, a power converter may be used to convert alternating-current (AC) power from a wall outlet to direct-current (DC) power to charge the battery. The electronic device may have an input-output port. The power converter may be connected to the input-output port. When connected in this way, the power converter may supply DC power at its output that is received by the electronic device. Battery charging circuitry in the electronic device may use the DC power from the power converter to charge the battery in the electronic device.

Maintaining the power converter in a constant active state may be wasteful of power. It may therefore be desirable to provide the power converter with control circuitry that can shut off the power converter when not in use. When the power converter is needed for normal operation, the control circuitry places the power converter in a normal active mode in which its internal circuitry is fully operational. When the power converter is not required for converting AC power into DC power at its output, the control circuitry can shut down most of the power converter circuitry to save power. This low power sleep mode can be maintained until power is required by the electronic device or until it is desired to recharge a capacitor, battery, or other energy storage element in the power converter.

The power converter may contain communications circuitry that receives control signals from the electronic device through a path in the input-output port. For example, the power converter can receive analog or digital commands that place the power converter into its active mode when the electronic device wishes to receive power to recharge its battery and can receive analog or digital commands that place the power converter in its sleep state when the electronic device does not wish to receive power.

The power converter may also contain automatic load detection circuitry. When there is no load present across the output of the power converter, the automatic load detection circuitry can be used to place the power converter in its sleep mode. When a load is detected, the power converter can be placed in its active mode to deliver power.

The electronic device may have protection circuitry or other circuitry at its input-output port that contains switching circuitry. The switching circuitry may be placed in an open circuit state whenever it is desired to protect the internal circuitry of the electronic device from out-of-range power supply voltages. The switching circuitry may also be controlled in a way that directs the power converter to transition between its sleep and active modes. When the power converter is using its automatic load detection circuitry to monitor its output, the opening of the protection circuit switch in the electronic device will cause the power converter to conclude that no load is present across its output, even when the power converter and the electronic device are still physically connected to each other. The power converter can therefore enter its sleep state while the electronic device temporarily operates from its internal battery. Once the battery has become slightly depleted, the electronic device can close the protection circuit switch. This will cause the power converter to detect an output load and awake from its sleep state to replenish the battery. By toggling the power converter between active and sleep states in this way, power can be conserved.

Further features of the invention, its nature and various advantages will be more apparent from the accompanying drawings and the following detailed description of the preferred embodiments.

DETAILED DESCRIPTION

Figure 1:
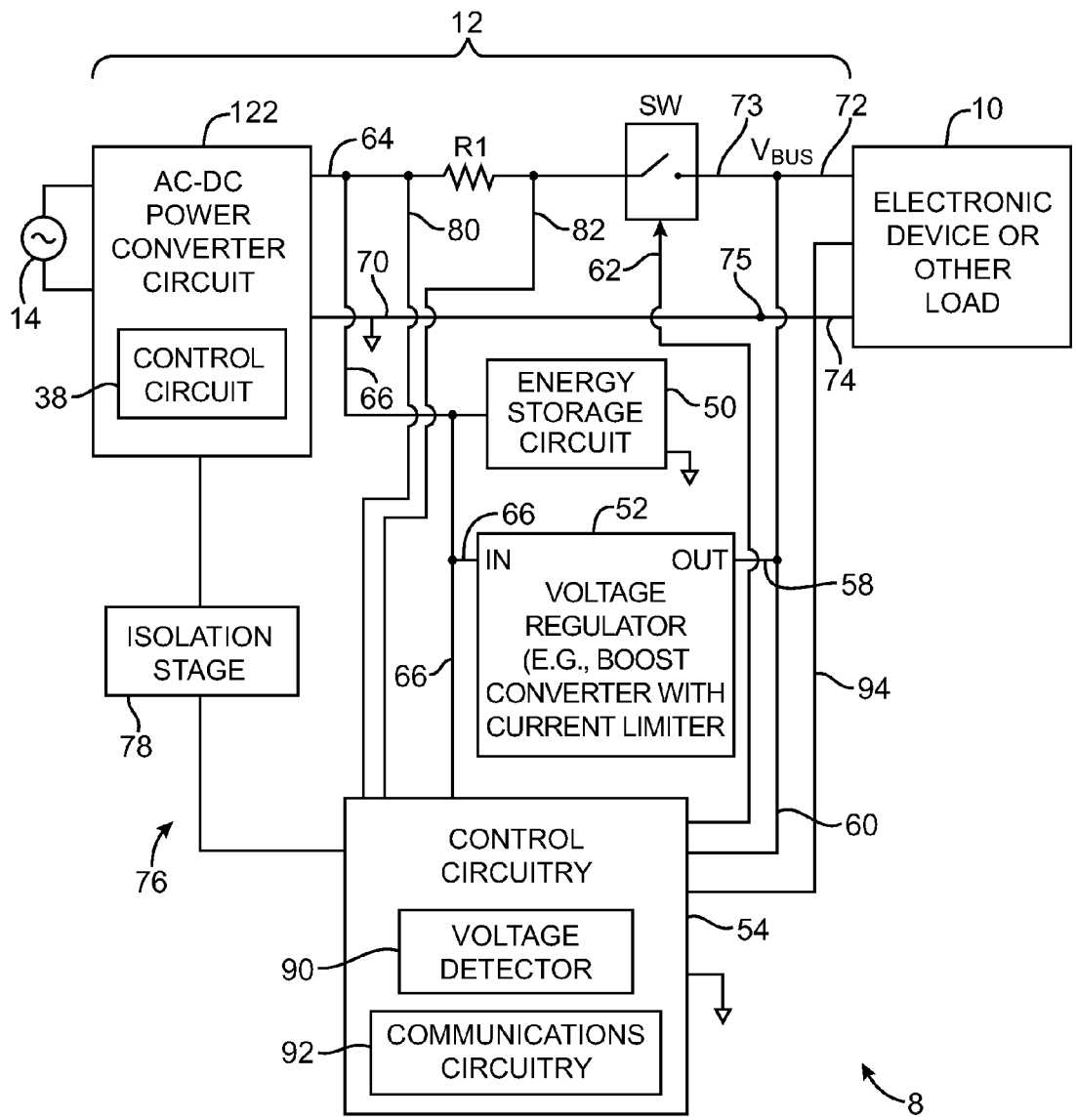
FIG. 1 is a circuit diagram of a system including a power converter with a load detector circuit and an electronic device or other load that is connected to the power converter in accordance with an embodiment of the present invention.

Power converters (sometimes referred to as power adapters) may be used to convert alternating current (AC) power into direct current (DC) power. For example, a wall charger for a portable electronic device may include an AC-to-DC power converter circuit. The wall charger represents a type of power converter. Power converters can be used for a variety of applications, but the use of power converters for charging batteries in electronic devices such as portable electronic devices is described herein as an example.

Power converters generally exhibit losses. At relatively high powers, power losses can be minimized by selection of an appropriate power converter topology for a power converter. At lower loads, power converters tend to experience reductions in conversion efficiency. When no load is present, some power converters exhibit standing losses due to non-negligible amounts of power consumption in the components of the power converter (e.g., leakage currents, etc.).

To ensure that power conversion efficiency is acceptable, the amount of time during which a power converter is operated at its peak efficiency (high-load conditions) can be maximized and the amount of time during which the power converter is operated at lower efficiencies (low-load or no-load conditions) can be minimized.

In particular, losses from operating the power converter in no-load conditions can be minimized by placing the power converter into a sleep mode whenever the power converter is not being actively used to supply power. When the power converter is needed for normal operations, the power converter may be awoken from the sleep mode.

During the sleep mode, power consumption can be reduced by turning off unessential circuitry. If, for example, the power converter uses a switched-mode AC-DC converter circuit, this circuit can be turned off during the sleep mode to reduce power losses from its internal components. An energy storage element such as a capacitor or battery may be used to power a relatively low power control circuit during the sleep mode. This circuit consumes relatively little power, but is capable of recognizing when the power converter should awake.

With one suitable arrangement, the power converter may have load detection circuitry. When there is no load present on the power converter, the load detection circuitry can sense the absence of the load and can automatically place the power converter in the low-power sleep mode.

When a user desires to charge the battery in an electronic device, the user may connect the electronic device to the power converter. When the battery in the electronic device is in a depleted state, the electronic device may charge the battery using power from the power converter. When charging is complete, the power converter is not needed. To avoid losses in the power converter when operated continuously in a low-output state, the power converter may be placed in the sleep mode, even while the electronic device is still connected to the power converter. Because the power converter is in the sleep mode, the electronic device will run off of its battery reserves. When the battery becomes sufficiently depleted to warrant additional charging, the power converter can be awoken from the sleep state.

Any suitable communications scheme may be used to sleep and awaken the power converter. For example, the electronic device may communicate with the control unit in the power converter over a data path between the electronic device and the power converter. In this type of scenario, the electronic device can monitor its battery level. When the battery requires charging, the electronic device may provide instructions to the power converter over the data path that direct the power converter to wake. Once the battery has been charged to a desired level, the electronic device may provide instructions to the power converter over the data path that direct the power converter to sleep.

With another suitable communications scheme, the electronic device can communicate with the power converter by modulating the apparent load on the power converter. The power converter may use the presence or absence of a load to determine whether or not the power converter should automatically enter the sleep mode. To exploit this behavior, the electronic device may create an open circuit at its input whenever it is desired to place the power converter in the sleep mode.

The electronic device may, for example, have a protection circuit at its input. The protection circuit may have switch (e.g., transistor-based switching circuitry). During normal operation, when a power supply voltage of an appropriate level (e.g., about 4.5-5.5 volts) is present on the electronic device input, the switch may be closed to allow power to flow into the electronic device. In its capacity as part of the protection circuit, the switch may be opened whenever the input power drifts out of range (e.g., by falling to an unacceptable level of 3.0 volts in this example). The switch may also be opened by the electronic device when the electronic device wants to operate using battery power, regardless of the voltage being provided by the power converter.

To avoid excessive wear on the battery and to avoid continually operating the power converter in an inefficient low-load state, the electronic device can revert to battery power whenever the battery is charged to within a given amount of its nominal maximum value. As an example, the electronic device can switch from using the power converter to using its internal battery whenever the battery has been charged to 97% of full. Because the battery is not charged above the 97% threshold (in this example), over-charging can be avoided. Moreover, because the battery power is being used to power the electronic device rather than a trickle current from the power converter, the power converter is not needed and can be placed in the sleep mode. Once the battery has fallen below a somewhat lower threshold (e.g., 95% of full), the electronic device can awaken the power converter to ensure that the battery remains fully charged.

The state of the switch in the protection circuit can be used to direct the power converter to sleep or wake. When power is required from the power converter to charge the battery, the protection circuit switch may be closed. In this situation, the load detection circuitry of the power converter may sense that a load is present on the output of the power converter. In response, the power converter may awaken itself and may use its switched-mode converter circuit to produce DC power at its output. When the electronic device determines that the battery in the electronic device has been sufficiently charged, the electronic device can open the protection circuit switch (even though the voltage level that the power converter is supplying to the electronic device is in its acceptable range). The open switch at the input to the electronic device creates an open circuit at the output of the power converter circuit. The power converter load detection circuit interprets the absence of a load at the output as an instruction to sleep. The power converter circuit is therefore placed in its sleep state. This process can be repeated if necessary. Whenever the battery of the device becomes somewhat depleted, the protection circuit switch can be closed, thereby waking the power converter and recharging the battery. When the battery is sufficiently charged, the electronic device can open the switch to place the power converter in the sleep mode to save power.

Power conservation schemes of this type can, in general, be used for any type of power converter and any type of attached load. Power converters are used to convert power levels and types. For example, a power converter may be used to boost or reduce a direct-current (DC) power level. Power converters may also be used to convert alternating current (AC) power into DC power. Power converters that are used in converting AC power to DC power are sometimes described herein as an example. In general, however, power converter circuitry may include circuitry for transforming any suitable input signal (e.g., AC or DC currents and voltages) into any suitable output signal (e.g., boosted, reduced, or otherwise transformed AC or DC currents and voltages). The use of power converters such as AC-to-DC power converters that produce regulated DC output voltages from AC input signals is merely illustrative.

In a typical scenario, a power converter may be plugged into a source of AC line power such as a wall outlet. The AC power source may provide power at 120 volts or 240 volts (as examples). Circuitry in the power converter may convert the AC line power that is received into DC power. For example, an AC to DC power converter may receive AC line power at an input and may supply DC power at a corresponding output. The output voltage level may be 12 volts, 5 volts, or any other suitable DC output level.

The circuitry in the power converter may be based on a switched mode power supply architecture. Switched mode power supplies use switches such as metal-oxide-semiconductor power transistors and associated control schemes such as pulse-width modulation control schemes or frequency modulation control schemes to implement power conversion functions in relatively compact circuits. When the switching circuitry has a first configuration, power is transferred from a power source to a storage element such as an inductor (e.g., a transformer) or a capacitor. When the switching circuitry has a second configuration, power is released from the storage element into a load. Feedback may be used to regulate the power transfer operation and thereby ensure that the output voltage is maintained at a desired level. Examples of switched mode power supply topologies that may be used in a power converter include buck converters, boost converters, flyback converters, etc.

With one suitable arrangement, which is described herein as an example, an AC to DC power converter may be implemented using a voltage rectifier and flyback converter. The voltage rectifier converts AC line power into DC power at a relatively high voltage level. The flyback converter portion of the power converter steps down the DC power at the output of the rectifier circuit to 12 volts, 5 volts, or other suitably low level for operating circuitry in an electronic device. If desired, other power converter architectures may be used. The use of a switched mode power converter arrangement that is based on a flyback converter design is described herein as an example.

An AC to DC power converter may supply DC power to any suitable load. As an example, an electronic device may receive the DC power. Examples of an electronic device that may receive DC power from an AC to DC power converter or other power circuit include a handheld computer, a miniature or wearable device, a portable computer, a desktop computer, a router, an access point, a backup storage device with wireless communications capabilities, a mobile telephone, a music player, a remote control, a global positioning system device, and a device that combines the functions of one or more of these devices. With one suitable arrangement, which is sometimes described herein as an example, the electronic device that receives power from the AC to DC converter is a portable computer or a compact portable device such as a handheld electronic device (e.g., a mobile telephone or music player). This is, however, merely illustrative. The AC to DC power converter may be operated in conjunction with any suitable electronic device or any other load.

An illustrative system environment in which a circuit such as a power converter or other circuit that handles power signals may provide power to an electronic device or other load is shown in FIG. 1. As shown in FIG. 1, system 8 may include a source of AC power such as AC power source 14, a power converter such as AC to DC power converter 12, and an electronic device or other suitable load such as electronic device 10.

AC power source 14 may be, for example, a standard wall outlet that supplies AC line power via a power cord. Wall outlet power is typically delivered at AC voltages of about 110 volts to 240 volts.

Power converter 12 may include a power converter circuit such as AC-DC power converter circuit 122. AC-DC power converter circuit 122 may be based on a switched-mode power supply design such as a flyback converter or other suitable power converter topology.

Electronic device 10 may have a battery for use in powering device 10 when unattached to power converter 12. When power converter 12 is plugged into AC power source 14 and when electronic device 10 is connected to power converter 12, power converter 12 can transform AC power that is received from AC power source 14 into DC power for device 10.

If desired, connectors may be provided at the input and/or output of power converter 12. For example, device 10 may have a universal serial bus (USB) port into which a USB cable may be plugged. The USB cable may be used to convey DC power between power converter 12 and electronic device 10. For example, the USB cable or other cable may contain a first line such as positive power supply line 72 that is used to convey a positive DC voltage at 12 volts, 5 volts, or other suitable positive DC voltage level from converter 12 to device 10. This DC voltage level is sometimes referred to as Vbus and line 73 of converter 12 is sometimes referred to as a power supply bus or output line. The USB cable or other cable may also have a second line such as ground line 74 that is used to convey a ground voltage at 0 volts or other suitable ground voltage level from ground line 75 to device 10. A cable such as a USB cable may also contain data lines that may optionally be used to convey information between device 10 and converter 12.

When connected to power converter 12, electronic device 10 may receive DC power through the power pins of the USB connector and cable (as an example). The use of a USB connector to connect power converter 12 and electronic device 10 is, however, merely illustrative. Any suitable plugs, jacks, ports, pins, other connectors, or a hardwired connection may be used to interconnect power converter 12 and electronic device 10 if desired. Similarly, a hardwired connection or a suitable plug, jack, port, pin structure, or other connector may be used to connect power converter 12 to power source 14.

AC-DC power converter circuit 122 may convert AC power from AC source 14 to DC power on output paths 64 and 70. Path 64 may be a positive power supply line that is coupled to converter output line 73 via series-connected current sensing resistor R1 and switch SW. During operation, current may flow across resistor R1, leading to a measurable voltage drop across lines 80 and 82. The magnitude of the voltage across resistor R1 may be measured using control circuitry 54 (e.g., using a voltage detector such as voltage detector 90 in control circuitry 54 that is coupled between lines 80 and 82). Because the magnitude of R1 may be determined in advance, measurement of the voltage across resistor R1 can be used to determine the amount of current flowing through line 64 (using Ohm's law). This calculation may be made by circuitry 54 or other circuitry in converter 12.

Voltage path 70 may be a ground power supply line that is coupled to ground output 75 of converter 12 and ground line 74 in the cable or other path connecting converter 12 to device 10. Switching circuitry such as switch SW may be based on any suitable electrical components that can control the flow of DC power from the output of AC-DC power converter circuit 122 to the power supply input lines associated with electronic device 10 (e.g., the inputs of device 10 that are connected to power supply lines 72 and 74). For example, switch SW may be implemented using one or more transistors such as one or more power field-effect transistors (power FETs). During normal operation in which an electronic device such as electronic device 10 is connected to power converter 12, power converter 12 may use AC-DC power converter circuit 122 to supply a DC power supply voltage on lines 64 and 70. Switching circuitry SW will generally be closed during normal operation, so line 64 will be shorted to output line 73. This allows the DC power supply voltages at the output of AC-DC power converter circuit 122 to be provided to electronic device via paths 72 and 74.

AC-DC power converter circuit 122 may contain control circuitry 38 for controlling internal switching circuits (e.g., transistor-based switches). The control circuitry may be responsive to feedback signals. For example, a feedback path that is formed using line 60, circuitry 54, and isolation stage 78 may be used to supply AC-DC power converter circuit 122 with information on the current level of voltage Vbus on output line 73. In response to this feedback information, the control circuitry in AC-DC power converter circuit 122 (i.e., control circuitry 38) can make real-time adjustments to the amount of DC voltage that is being supplied to the output of AC-DC power converter circuit. For example, if the DC voltage on output 64 has a nominal value Vsec of 5 volts and feedback indicates that the voltage has undesirably risen to 5.05 volts, the control circuitry in AC-DC power converter circuit 122 can make adjustments to lower the DC output voltage back to the nominal value (Vsec).

Power converter 12 may contain an energy storage circuit 50. Energy storage circuit 50 (sometimes also referred to as an energy storage element) may be based on any suitable circuitry for storing energy. As an example, energy storage circuit 50 may include one or more batteries, capacitors, etc. During operation of power converter 12 when AC-DC power converter circuit 122 is supplying power to output path 64, a path such as path 66 may be used to route power to energy storage circuit 50. The power that is routed to energy storage circuit 50 in this way may be used to replenish the battery, capacitor or other energy storage components in circuit 50. In the example of FIG. 1, energy storage circuit 50 is coupled to AC-DC power converter circuit 122 by paths 64 and 66. This is, however, merely illustrative. Any suitable routing paths may be used to supply replenishing power from AC-DC power converter circuit 122 to energy storage circuit 50 if desired.

Voltage detector 90 may be used by control circuitry 54 to monitor the voltage across resistor R1 and thereby assess current flow through device 10. Paths 80 and 82 may be used to supply signals from resistor R1 to circuitry 54 and voltage detector 90. Voltage detector circuitry 90 may also be used to monitor the output voltage on output 64 of converter circuit 122 using path 66 and the voltage Vbus on output 72 using path 60.

Control circuitry 54 may, if desired, include optional communications circuitry 92. Communications circuitry 92 may process signals received from device 10 via paths such as path 94. Path 94 may be formed from a single conductive line, multiple paths (e.g., to support differential signaling schemes), paths supporting analog signals, paths supporting digital signals, or other suitable communications paths between device 10 and converter 12. Paths such as path 94 may be used to receive commands from device 10 (e.g., commands that instruct power converter 12 to wake from a sleep mode, to enter sleep mode when awake, etc.).

An isolation element such as isolation stage 78 may be interposed in path 76. The control signals that are provided over path 76 may be used to direct control circuitry 38 to make adjustments to the operation of converter circuit 122 (e.g., to increase or decrease the output voltage on line 64 and/or to place AC-DC power converter circuit in an appropriate operating mode). In general, any suitable number of operating modes may be supported by AC-DC power converter circuit 122 if desired.

With one suitable arrangement, which is sometimes described herein as an example, AC-DC power converter circuit 122 may be placed in an active mode and a sleep (standby) mode. In the active mode, which is sometimes also referred to as a high-power mode or normal operating mode, AC-DC power converter 122 is on and supplies DC output power for replenishing energy storage circuit 50 and for powering electronic device 10. In the sleep mode, which is sometimes referred to as a standby mode or low-power mode, AC-DC power converter circuit 122 is placed in a state in which little or no power is consumed by AC-DC power converter circuit 122 (i.e., AC-DC power converter circuit 122 is turned off by inhibiting modulation of its switched-mode power supply switches). If desired, AC-DC power converter circuit 122 may have multiple lower power states (e.g., a partly off state and a fully-off state). Arrangements in which AC-DC power converter 122 is placed in either a standby state or an active state are sometimes described herein as an example. This is, however, merely illustrative. Power converter 12 may, in general, support any suitable number of operating modes (e.g., a fully-on mode, a partly-on mode, a sleep mode, a deep sleep mode, etc.).

When AC-DC power converter circuit 122 is in standby mode, AC-DC power converter circuit 122 is off and allows output 64 to float. In this situation, the power that has been stored in energy storage circuit 50 may be delivered to path 66 from within energy storage circuit 50. For example, if energy storage circuit 50 contains a battery or a capacitor, the battery or capacitor may be used to supply a battery or capacitor voltage to path 66. The voltage supplied by energy storage circuit 50 may be supplied at the same voltage level as the nominal output voltage level (Vsec) that AC-DC power converter circuit 122 supplies to path 64 when AC-DC power converter circuit 122 is in active mode.

Voltage regulator 52 may receive the voltage supplied by energy storage circuit 50 via path 66 on its input IN and may supply a corresponding output voltage to output path 58 via its output OUT. In the absence of a load on output line 73, the voltage that voltage regulator 52 supplies to path 58 may be elevated with respect to Vsec (i.e., the voltage supplied by voltage regulator 52 to path 58 during standby operations may be equal to an elevated voltage Vaux that is larger than Vsec). If, for example, Vsec is 5.0 volts (as an example), Vaux may be 5.1 volts (as an example).

Output line 58 may be coupled to output line 73 and path 72. During standby mode, circuitry 54 may supply a switch control signal to switching circuitry SW via a path such as path 62. The control signal may place SW in an open mode in which lines 64 and 73 are electrically disconnected from each other. Disconnecting output line 73 from path 64 isolates output 73 from AC-DC power converter circuit 122 and energy storage circuit 50. The voltage that output line 73 assumes following the opening of switching circuitry SW by circuitry 54 depends on the status of electronic device 10.

If electronic device 10 is disconnected from power converter 12 or is configured to present no load to the output of converter 12, voltage regulator 52 will supply elevated voltage Vaux to output line 73 via paths 58 and 56 when switching circuitry SW opens, thereby driving Vbus to Vaux. If, when control circuitry 54 opens switching circuitry SW, electronic device 10 is connected to power converter 12 and is configured to present a load to the output of converter 12, electronic device 10 will operate as a load and will draw power from voltage regulator output OUT via lines 58 and 56. Voltage regulator 52 may contain a current limiting circuit that ensures that voltage regulator 52 will only be able to supply a relatively modest amount of current to electronic device 10. As a result, the power draw from electronic device 10 will pull Vbus low.

If communications circuitry 92 is included in circuitry 92, power converter 12 can use information from device 10 that has been received on path 94 in determining an appropriate operating mode. Communications circuitry 92 and path 94 need not be used, however, when power converter 12 uses its automatic load detection capabilities. These load detection capabilities can be implemented using resistor R1, switch SW and its associated circuitry, or both resistor R1 and switch SW (as examples).

In a typical automatic-load-detection scenario, circuitry 54 determines the attachment status of electronic device 10 by monitoring the voltage Vbus on output line 73 via paths 56 and 60. If circuitry 54 detects a rise in voltage Vbus when switching circuitry SW is opened, circuitry 54 can conclude that electronic device 10 is currently detached from power converter 12 or that device 10 has open-circuited its input by opening its protection circuit switch. In either of these conditions, power converter 12 need not produce output power and can enter sleep mode. If circuitry 54 detects a drop in voltage Vbus when switching circuitry SW is opened, monitor 54 can conclude that electronic device 10 is currently attached to power converter 12 and requires power. Whenever circuitry 54 determines that electronic device 10 is attached to power converter 12 and requires power, circuitry 54 may place AC-DC power converter circuit 122 in active mode and may close switch SW to supply device 10 with power. If the presence of electronic device 10 is not detected, circuitry 54 may leave AC-DC power converter circuit in standby mode to conserve power. If circuitry 54 detects that energy storage circuit 50 has become depleted due to prolonged operation in standby mode, circuitry 54 may awaken AC-DC power converter circuit 122 momentarily to replenish energy storage circuit 50.

During active mode, circuitry 54 may continually monitor its output to determine whether a device that requires power is connected to lines 72 and 74. Relatively large load currents can be detected using current sensing resistor R1 without opening switch SW. Currents of this size are typically associated with active charging of the battery in device 10 and/or supplying power to active circuitry in device 10. Smaller currents of the type that may be associated with the latter stages of a typical constant-current-constant-voltage charging sequence or the operation of small amounts of circuitry in device 10 can be detected by periodically opening switch SW while monitoring voltage Vbus using circuitry 52. To prevent undesired excessive changes in voltage Vbus during the periodic opening of switch SW, circuitry 54 may use the current sensing resistor R1 to test for the presence of a large load current before each scheduled opening of switch SW. If a large load current is detected, circuitry 54 may inhibit the opening of switch SW (i.e., the periodic opening of switch SW can be interrupted so long as current is detected using resistor R1).

Figure 2:
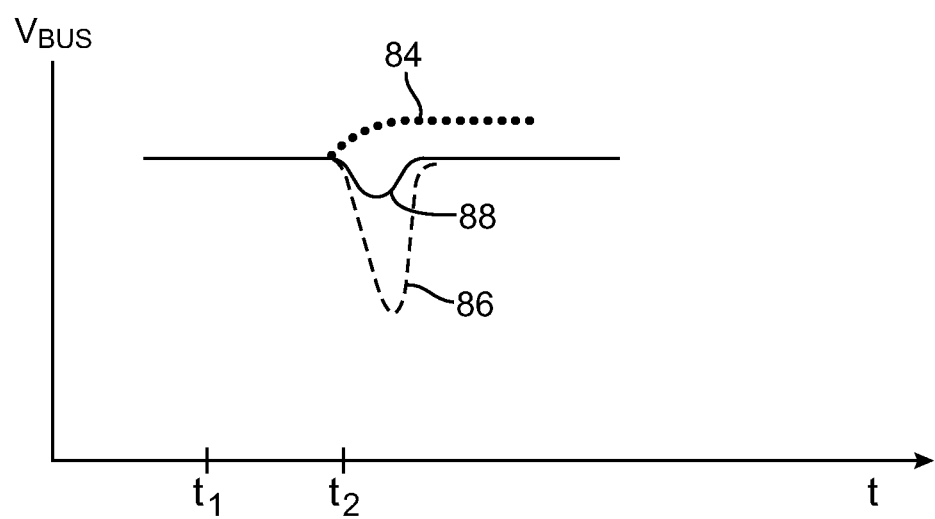
FIG. 2 is a graph showing how the output voltage from a power converter of the type shown in FIG. 1 may evolve under various conditions in accordance with an embodiment of the present invention.

The graph of FIG. 2 shows how the voltage Vbus may evolve in different situations when switch SW is opened. As shown in FIG. 2, the voltage on Vbus is initially constant (time t1). If switch SW is opened at time t2, power delivery from AC-DC power converter circuit 122 will be interrupted. Voltage regulator 52 (e.g., a current limited boost circuit) may supply a voltage on line 56 that is elevated with respect to the nominal output voltage from converter 122. When switch SW is opened and no load is present, this elevated voltage will cause the voltage Vbus to rise, as shown by dotted line 84. Control circuitry 54 can detect this rise and thereby conclude that no load is present. The absence of the load may indicate that device 10 has been completely disconnected from power converter 12 or may indicate that device 10 has created an open circuit at its input by opening a switch in its input circuitry.

If Vbus drops when switch SW is opened, circuitry 54 can detect the corresponding drop in voltage Vbus and can conclude that a load is connected to lines 72 and 74. In some situations, there may be a large load current flowing through device 10. For example, if a battery in device 10 is being charged or another load with a relatively high power demand is presented across the output of converter 12, a current of 1-2 amps or more may flow through the load. If a relatively large load current is flowing and/or if switch SW is opened for a relatively long amount of time due to propagation delays, the voltage Vbus may drop excessively during the time period that SW is open. This potential for an excessive drop in voltage Vbus is illustrated by dashed line 86 in FIG. 2. If Vbus drops excessively, device 10 may experience an undesirable lockup or other undesired or unintended operations may result. It is therefore generally desirable to limit the amount by which voltage Vbus can drop during an open switch condition for switch SW (e.g., to a voltage drop of the type illustrated by solid line 88 of FIG. 2).

One way to ensure that voltage Vbus drops no more than shown by line 88 is to use a high-speed transistor and control circuit for switch SW. Although this approach can be satisfactory in some circumstances, excessive demands on the speed of switch SW can be costly to implement. Moreover, the use of a short "open" time for switch SW may make it difficult to discriminate between low-load and no-load conditions.

By using current sense resistor R1 to perform high current detection operations, the use of switch SW and voltage regulator 52 can be reserved for use in low current detection operations. This type of arrangement involves making initial (coarse) load current measurements using resistor R1 and circuitry 54 (e.g., at time t1). Only if it is determined that no coarse currents (e.g., 1-2 amp currents or more) are flowing through the load are more sensitive current sensing techniques (i.e., techniques involving the opening of switch SW) used.

The ability to determine whether large load currents are flowing through lines 64 and 70 before opening switch SW may help avoid the need to implement switch SW with a fast transistor and drive circuit. Once it has been determined that no large load currents are being drawn, the presence or absence of smaller load currents can be investigated by opening switch SW and monitoring the resulting change in voltage Vbus. If no load is connected to lines 72 and 74, this subsequent opening of switch SW will cause Vbus to rise, because Vbus is being driven high by the output of current limited boost circuit 52. If a load is present, the opening of a switch SW will disconnect Vbus from the output of AC-DC power converter circuit. The output of voltage regulator circuit 52 is current limited, so the load current from device 10 will pull Vbus low. Because the load has been pre-tested using resistor R1, high-current situations that could result in a voltage drop of the type shown by dashed line 86 will be avoided (i.e., the voltage drop will appear as depicted by solid line 88).

Load detection circuits of this type in which load currents in multiple different ranges are sensed may sometimes be referred to as multirange load detection circuits. In the FIG. 1 example, high-range load currents are detected by resistor R1 and monitor 54 and low-range load currents are detected using monitor 54, switch SW, and current limited voltage regulator 52. Other arrangements may be used if desired. For example, a multirange load detection circuit can be implemented using three or more load-current-detection ranges, a multirange load detection circuit can be implemented using current sensors of different types, etc.

Figure 3:
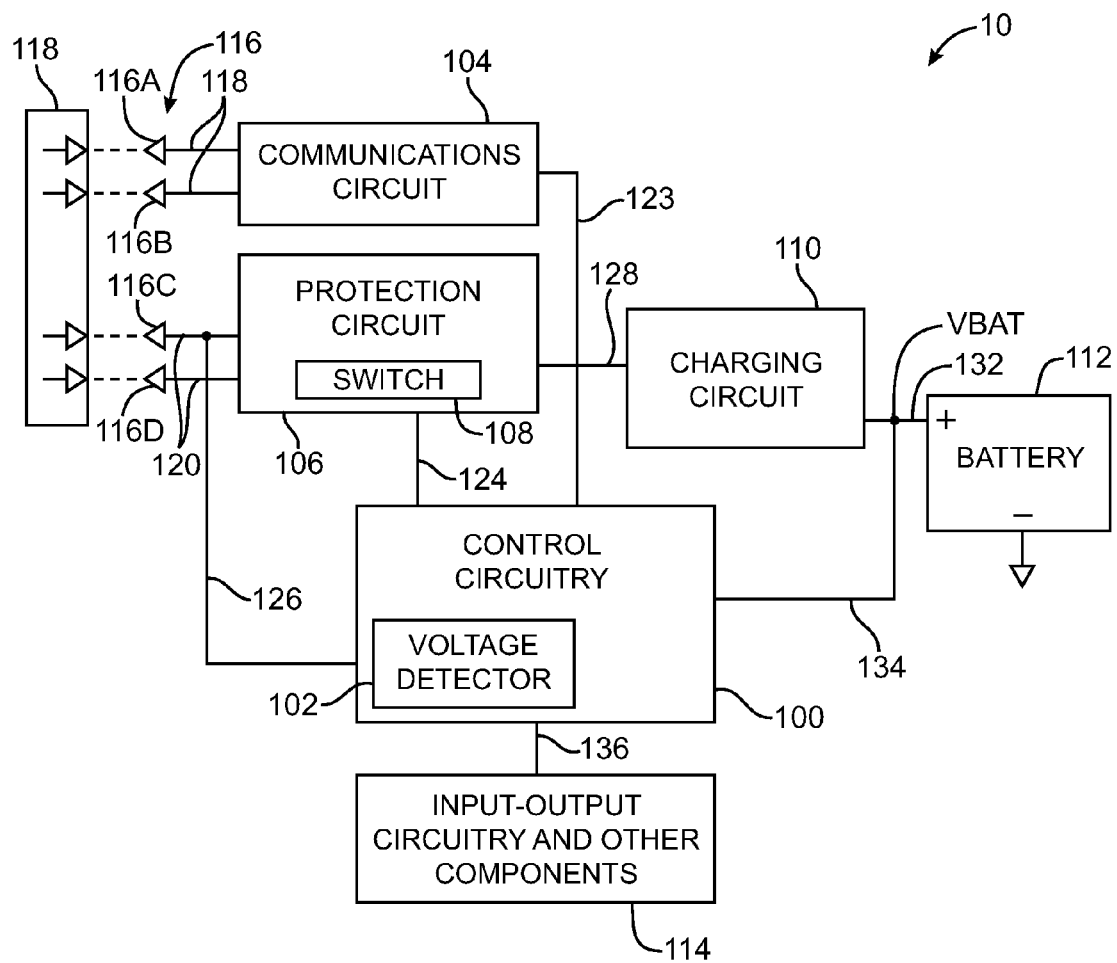
FIG. 3 is a circuit diagram of an illustrative electronic device of the type that may be charged by a power converter of the type shown in FIG. 1 in accordance with an embodiment of the present invention.

As shown in FIG. 3, the operations of electronic device 10 may be coordinated using control circuitry 100. Control circuitry 100 may be coupled to input-output circuitry and other components (circuitry 114) using paths 136. Circuitry 114 may include, for example, a touch screen display, buttons, speakers, a microphone, status lights, input-output ports for audio and video accessories, sensors, etc. Control circuitry 100 may include storage circuitry such as memory chips, hard disk drives, solid state drives, and removable media. Control circuitry 100 may also include processing circuitry such as microprocessors, microcontrollers, digital signal processors, application-specific integrated circuits, etc. These circuits may be implemented using one or more integrated circuits, discrete components, combinations of integrated circuits and discrete components, etc.

Device 10 may have a connector at its input such as connector 116. Connector 116 may include electrical contacts such as contacts 116A, 116B, 116C, and 116D. In the example of FIG. 3, connector 116 has four contacts, but fewer contacts or more contacts may be used in connector 116 if desired. Connector 116 may be connected to mating connector 118. Connector 118 may be, for example, a plug that is associated with power converter 12 or a plug that is part of a cable that connects power converter 12 to device 10.

Optional communications circuitry 104 may be used to communicate with optional communications circuitry 92 of power converter 12 (FIG. 1). Communications circuitry 104 may be connected to control circuitry 100 using paths such as path 123. When control circuitry 100 desires to transmit data to power converter 12, path 123 may be used to direct communications circuitry 104 to transmit analog or digital data signals (e.g., multi-bit data packets) on one or more conductive lines in input-output path 118. These signals may then be conveyed to communications circuitry 92 of power converter 12 using contacts such as contacts 116A and 116B, mating contacts in connector 118, and path 94 (FIG. 1). During data reception operations, signals transmitted by communications circuitry 92 of power converter 12 may be received by communications circuit 104 via contacts 116A and 116B. These received signals may then be transmitted to control circuitry 100 via path 123.

Contacts 116C and 116D of connector 116 may, through their connection with mating contacts in connector 118, be electrically coupled to outputs 73 and 75 of power converter 12 (FIG. 1). For example, contact 116C may receive voltage Vbus from output 73 via line 72 and contact 116D may be electrically connected to ground 75 via line 74.

Because the contacts of connector 116 may be used to handle input signals and output signals for device 10, connector 116 and contacts 116A, 116B, 116C, and 116D may be said to form an input-output port for device 10.

Device 10 may have switching circuitry at its input. This switching circuitry may be used in regulating power flow through connector 116. In the example of FIG. 3, switching circuitry at the input-output port of device 10 has been provided in the form of switch 108 in protection circuit 106. This is, however, merely illustrative. Any suitable switching circuitry may be coupled to the input-output port of device 10 if desired.

Protection circuit 106 and its internal switching circuitry (illustrated as switch 108 in FIG. 3) may be used as protection circuitry for device 10. Control circuitry 100 may have voltage detection circuitry such as voltage detector 102. Voltage detector 102 may be coupled to contact 116C using path 126. When power converter 12 is operating to deliver power to device 10, the voltage Vbus on path 126 should normally fall within predetermined allowable range (e.g., 4.5-5.5 volts). If voltage detector 102 detects that the voltage on path 126 is not within this allowed range (i.e., if the input voltage is unexpectedly low at 3.0 volts), control circuitry 100 can use path 124 to instruct protection circuit 106 to open switch 108. This creates an open circuit at the input-output port of device 10 by electrically isolating contact 116C and, if desired, contact 116D from the internal circuitry of device 10. By electrically isolating the circuitry of device 10 from the input-output port of device 10 when the power supply voltage is out of range, damage to the components in device 10 may be avoided.

Switch 108 can also be placed in an open circuit condition when it is desired to create an open circuit at the output of power converter 12 to interrupt charging operations. For example, when device 10 desires to operate using power from battery 112 and thereby allow power converter 12 to enter its sleep state, control circuitry 100 can instruct protection circuit 106 to open switch 108. In this situation, the terminals at the input to device 10 are open circuited and no load appears across lines 73 and 75 of power converter 12 (FIG. 1). With the load effectively removed from the output of power converter 12, power converter 12 will conclude that no power is required at its output and will enter standby operation. Power from battery 112 can be conveyed to control circuitry 100 via line 134.

During normal operation, switch 108 is closed. In this configuration, power from power converter 12 that is received at the input device 10 is provided to charging circuit 110 via protection circuit 106 and path 128. Charging circuit 110 can be used to regulate the delivery of power to battery 112 via path 132. When power is being received from the power converter, the output voltage from charging circuit 110 or other suitable power supply circuitry may be used to power components in device 10. For example, control circuitry 100 may receive power from the output of charging circuit 110 via path 134.

The voltage VBAT that is produced on paths 132 and 134 varies as a function of time. For example, when a user is operating device 10 on battery power, VBAT will tend to decrease over time. The voltage that is produced by battery 112 when battery 112 is fully charged depends on the type of battery chemistry that is used in implementing battery 112 and the number of cells that are involved. In a typical configuration, battery 112 may be implemented using a lithium ion battery that produces a nominal fully-charged output voltage of about 4.2 volts. As this type of battery becomes depleted during use, the voltage VBAT will tend to decline. The rate of decline may initially be gradual and will tend to accelerate when battery 112 is nearly exhausted.

Excessive charging of battery 112 may adversely affect battery life. Control circuitry 100 may therefore use voltage detector circuitry 102 to monitor the magnitude of VBAT using path 134. When the battery voltage VBAT passes a threshold amount VH (e.g., 97% of full), charging can be halted. Control circuitry 100 may, for example, open switch 108 to prevent power from flowing between power converter 12 and device 10. By halting charging operations before battery 112 reaches its theoretical maximum charge value, battery life may be extended. If desired, battery 112 can be charged more fully (e.g., to maximize battery capacity) or less fully (to help further extend battery life). The use of a maximum charge threshold of 97% of the battery's full-charge voltage is merely illustrative.

When control circuitry 100 opens switch 108 to halt charging, power converter 12 uses its load detection circuitry to recognize the absence of a load across its output. This allows power converter 12 to enter sleep mode to conserve power.

Device 10 can continue to operate normally by using its battery reserves. A user who has plugged power converter 12 into device 10 generally expects device 10 to charge fully. Accordingly, it may be desirable to limit the amount that device 10 can deplete its battery while power converter 12 is attached. This may be accomplished by using voltage detector 102 to detect when battery 112 has discharged sufficiently to cause battery output voltage VBAT to fall below a given threshold (e.g., a threshold voltage VL that is lower than threshold voltage VH, but that is still relatively high). If, for example, upper threshold voltage VH is 97% of the maximum battery voltage for battery 112, lower threshold voltage VL may be 95% of the maximum battery voltage for battery 112 (as an example). Other values of VH and VL may also be used (e.g., values above 85% of full, values above 90% of full, values above 95% of full, etc.). The use of 97% and 95% of full threshold values for upper and lower threshold voltages VH and VL is merely illustrative.

So long as VBAT remains above VL, control circuitry 100 may allow device 10 to operate from its battery reserves. This allows power converter 12 to remain in its sleep state. If, however, voltage detector circuitry 102 determines that VBAT has fallen below VL, power converter 12 can be awoken to recharge battery 112.

Figure 4:
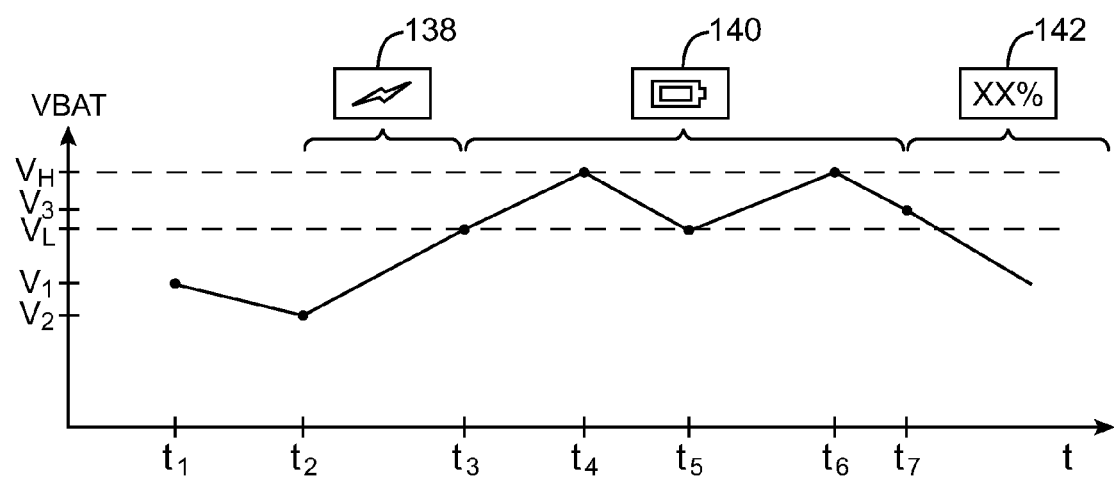
FIG. 4 is a graph showing how a battery in an electronic device of the type shown in FIG. 3 may be charged using a power converter of the type shown in FIG. 1 in accordance with an embodiment of the present invention.

A graph illustrating a typical usage scenario is shown in FIG. 4. In the example of FIG. 4, the voltage VBAT of battery 112 is initially at voltage V1 (i.e., at time t1). Device 10 in this example is not initially connected to power converter 12, so battery 112 is used to power device 10. Power converter 12 therefore has no load across its output and enters its sleep state. As device 10 is operated, the circuitry of device 10 consumes power and battery voltage VBAT drops to voltage V2.

At time t2, the user decides that the battery in device 10 should be charged and therefore connects device 10 to power converter 12. The user may, for example, use a universal serial bus cable or other cable to electrically connect the output of power converter 12 to the input of device 10 (i.e., to connect the contacts in connector 118 to the respective contacts of connector 116 in FIG. 3).

When device 10 is connected to power converter 12, the automatic load detection circuitry of power converter 12 automatically detects the presence of device 10, because switch 108 in protection circuit 106 is closed. Once the load is detected, power converter 12 awakes and supplies power to device 10. This power is used to charge battery 112. If desired, a visual status indicator such as icon 138 can be displayed on the display of device 10 to indicate that device 10 is currently charging. At time t3, voltage VBAT rises above threshold voltage VL. Although not charged to its theoretical maximum value, the battery voltage at VL is sufficiently high that it may be desirable to display an icon such as icon 140 on the display of device 10 to indicate that battery 112 is charged. To avoid confusing the user, this "fully charged" indicator can be displayed so long at VBAT has a value above VL, even though it is possible to charge battery 112 to any of a range of values above VL.

During the charging process, device 10 may use voltage detector 102 to monitor the value of VBAT on line 134. When VBAT reaches (exceeds) upper threshold voltage VH at time t4, control circuitry 100 can open switch 108 and allow device 10 to be powered by battery 112. When switch 108 is opened at time t4, there is an open-circuit condition on the input port of device 10. As a result, the automatic load detection circuitry of power converter 12 senses the absence of a load across its output. Power converter 12 is therefore directed to enter its sleep mode to conserve power. If desired, a command for power converter 12 to enter the sleep state may be communicated between control circuitry 100 of device 10 and control circuitry 54 of power converter 12 using communications circuit 104 and communications circuit 92. The use of communications circuits 104 and 92 may be satisfactory when the added complexity of circuits 104 and 92 is acceptable (e.g., when these circuits are also used to implement additional functionality in system 8). In situations in which it is desired to minimize cost and complexity, it may be preferable to control power converter 12 by modulating the state of switch 108 in protection circuitry 106. Illustrative scenarios in which device 10 directs power converter 12 to change its state by way of controlling the status of switching circuitry 108 are therefore sometimes described herein as an example.

After opening switch 108 at time t4, device 10 reverts to battery power. The value of VBAT therefore decreases from VH at time t4 to VL at time t5. Changes to the displayed battery indicator icon between time t4 and time t5 may confuse a user who is expecting device 10 to be fully charged. As shown in FIG. 4, it may therefore be desirable to display a fixed "fully charged" battery charge status indicator (e.g., icon 140) on the display of device 10 even as the voltage VBAT fluctuates between VL and VH. When control circuitry 100 detects that VBAT has fallen to VL (time t5), control circuitry 100 can close switch 108. Power converter 12 will therefore detect the presence of a load across its output and will wake from its sleep mode to deliver power to device 10. As power is delivered, charging circuit 110 charges battery 112.

In the example of FIG. 4, voltage VBAT of battery 112 reaches upper voltage threshold VH at time t6. When this condition is detected by voltage detector 102, control circuitry 100 may again open switch 108. This places power converter 12 in sleep mode. So long as device 10 and power converter 12 remain connected, this process may be repeated. Each time the battery voltage reaches VH during charging, device 10 switches to battery power and opens switch 108 or otherwise instructs power converter 12 to enter its standby mode. Each time the battery voltage falls to VL, switch 108 is closed or other actions are taken to awaken power converter 12 and recharge the battery.

In the FIG. 4 example, the user decides to disconnect device 10 from power converter 12 at time t7. This removes the load presented by device 10 from the output of power converter 12, so that power converter 12 may enter its sleep mode. Device 10 can operate from battery power at times after t7. As the power of battery 112 is depleted, the voltage VBAT will fall accordingly. A battery level indicator may be displayed on device 10 to provide the user with real-time information on the battery level. For example, a battery level indicator such as indicator 142 may be displayed (e.g., to show the amount remaining as a percentage of full charge, using a full/empty gauge with a number of different levels, etc.).

Figure 5:
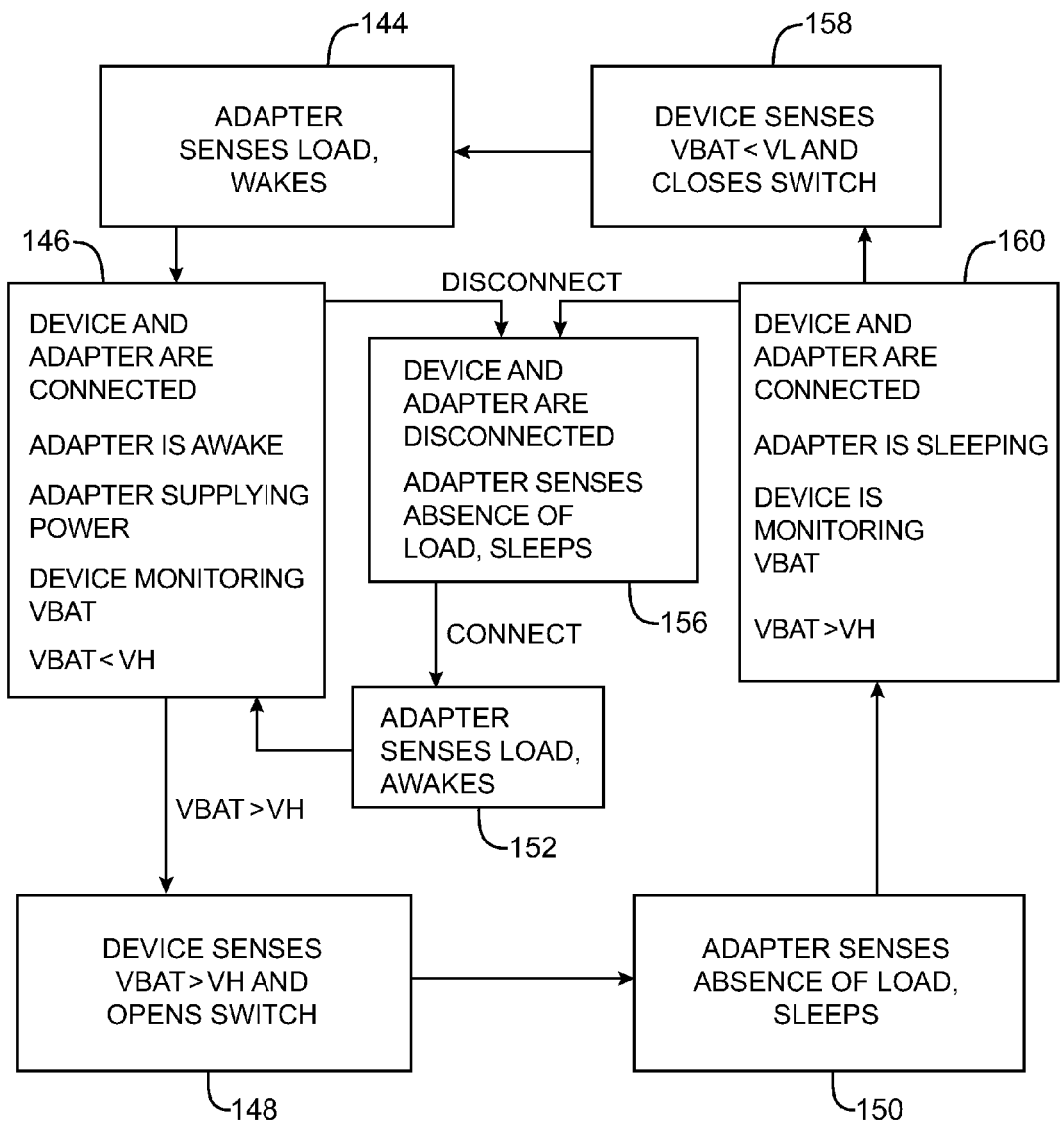
FIG. 5 is a flow chart of illustrative steps involved in operating a system that includes a power converter of the type shown in FIG. 1 and an electronic device of the type shown in FIG. 3 in accordance with an embodiment of the present invention.

A flow chart of illustrative steps involved in operating device 10 and power converter 12 of system 8 is shown in FIG. 5.

During the operations of step 146, device 10 and power converter 12 are connected to each other (e.g., using a cable or other connection). Battery voltage VBAT is lower than threshold voltage VH. Power converter 12 is awake and is supplying power to device 10 to charge battery 112. Voltage detector 102 is being used to monitor the level of VBAT. Step 146 may, as an example, correspond to the configuration of system 8 at times between t2 and t4 of FIG. 4.

Control circuitry 100 uses voltage detector 102 to determine when VBAT exceeds VH. When VBAT rises above VH, control circuitry 100 opens switch 108 (step 148). When switch 108 is opened, the load across the output of power converter 12 is no longer present. Power converter senses the absence of a load across its output (step 150) and enters sleep mode.

While power converter 12 is sleeping, no power is being delivered to device 10 from power converter 12. In this state, device 10 operates from battery power while monitoring voltage VBAT (step 160). Without a source of external power, battery voltage VBAT drops, as indicated by the graph of FIG. 4 for times between t4 and t5.

When device 10 senses that VBAT has fallen below VL, device 10 closes switch 108 (step 158). At step 144, power converter 12 senses the load present across its output (due to the closed state of switch 108) and therefore wakes from the sleep state. Power can then be delivered to device (step 146).

If, during the operations of step 146 or the operations of step 160, the user disconnects power converter 12 and device 10, device 10 will operate under battery power from battery 112 while power converter 12 will enter sleep mode (step 156). Switch 108 may be held closed during the operations of step 156, so that power converter 12 will be able to detect when device 10 and power converter 12 are connected to each other.

Once the user reconnects device 10 and power converter 12, power converter 12 will sense the presence of a load at its output (step 152). Power converter 12 will therefore enter its normal active state and begin supplying power to device 10 (step 146).

If desired, device 10 and power converter 12 can communicate using communications circuits 104 and 92 instead of communicating by way of opening and closing switch 108 and detecting the state of switch 108 using the load detection circuitry of converter 12. The use of the state of switch 108 to instruct converter 12 to operate in sleep mode or active mode is presented as an example.

The foregoing is merely illustrative of the principles of this invention and various modifications can be made by those skilled in the art without departing from the scope and spirit of the invention.

What is claimed is:

1. A method of operating an electronic device that receives power from a power converter that operates in a sleep mode and an active mode, comprising:

while the power converter is connected to the electronic device, periodically using circuitry in the electronic device to switch the power converter between the sleep mode and the active mode;

wherein the power converter is placed into the sleep mode when the power converter detects that output loading from the electronic device is absent, and the power converter is placed into the active mode when the power converter detects that output loading from the electronic device is present, wherein the electronic device opens a switch in a protection circuit to electrically isolate the power converter from the electronic device so that the power converter detects an absence of output loading and, in response to the detection of the absence of output loading, the power converter enters into the sleep mode, wherein the protection circuit protects the electronic device when a power supply voltage is out of range, and wherein the electronic device closes the switch in the protection circuit to electrically connect the power converter to the electronic device so that the power converter detects a presence of output loading and, in response to the detection of the presence of output loading, the power converter enters into the active mode.

2. The method defined in claim 1 wherein periodically using the circuitry comprises sending digital data to the power converter using communications circuitry in the electronic device.

3. The method defined in claim 1 wherein the electronic device has an input-output port with electrical contacts and wherein periodically using the circuitry in the electronic device to switch the power converter between the sleep mode and the active mode comprises transmitting control signals to the power converter through at least a first of the electrical contacts, the method further comprising:

receiving power from the power converter through at least a second of the electrical contacts that is different than the first of the electrical contacts when the power converter is in the active mode.

4. The method defined in claim 1 wherein the switch in the protection circuit is coupled to the input-output port in the electronic device.

5. An electronic device to which an alternating current (AC) to direct current (DC) power converter is selectively coupled, comprising:
   a battery;
   a connector to which output lines in the power converter are electrically connected; and
   circuitry comprising of a switch in a protection circuit, wherein the protection circuit protects the electronic device when a power supply voltage is out of range, the circuitry configured to:
      receive power from the battery while electrically isolating the connector from the battery while the power converter is connected to the connector, wherein the electronic device opens the switch in the protection circuit to prevent power flow between the power converter and the electronic device so that the power converter detects an absence of output loading and, in response to the detection of the absence of output loading, the power converter enters into the sleep mode; and
      receive power from the power converter through the output lines while electrically coupling the connector to the battery, wherein the electronic device closes the switch in the protection circuit to allow power flow between the power converter and the electronic device so that the power converter detects a presence of output loading and, in response to the detection of the presence of output loading, the power converter enters into the active mode.

6. The electronic device defined in claim 5 wherein the circuitry comprises a voltage detector configured to monitor voltage on the battery to determine whether the battery has sufficient charge before electrically isolating the connector from the battery.

7. The electronic device defined in claim 5 further comprising a display in the circuitry that displays battery status information indicative of how much voltage is being produced by the battery.

8. A method of operating an electronic device that has a battery so that a power converter that is attached to the electronic device can periodically enter a low-power sleep state, comprising:
   while powering the electronic device from the battery, electrically isolating the attached power converter from the electronic device by opening a switch in a protection circuit in the electronic device so that the attached power converter detects an absence of output loading and, in response to the detection of the absence of output loading, the attached power converter enters the low-power sleep state, wherein the protection circuit protects the electronic device when a power supply voltage is out of range; and
   when voltage on the battery falls below a given amount, electrically connecting the attached power converter to the electronic device by closing the switch in the protection circuit in the electronic device so that the attached power converter detects that an output load is present and, in response to the detection that an output load is present, the attached power converter wakes from the low power sleep state to supply power to the electronic device.

9. The method defined in claim 8 wherein the electronic device has a voltage detector, the method further comprising monitoring the voltage on the battery to determine when the voltage on the battery falls below the given amount.

10. The method defined in claim 9 wherein the switch in the protection circuit is coupled to an input-output port connector in the electronic device and wherein electrically isolating the attached power converter comprises opening the switch to electrically isolate circuitry within the electronic device from the input-output port connector.

11. The method defined in claim 9 further comprising:
    monitoring the voltage on the battery to determine when the voltage on the battery has risen above a threshold voltage, wherein the threshold voltage is larger than the given amount.

12. The method defined in claim 8 further comprising:
    while the voltage on the battery fluctuates between different values above the given amount, displaying a fixed battery charge level indicator on a display in the electronic device indicating that the battery is full.

13. An electronic device, comprising:
    an input;
    a battery producing a battery voltage;
    circuitry coupled to the battery;
    a switch in a protection circuit coupled to the input that is operable in an open state that electrically isolates the input from the circuitry and a closed state that electrically connects the input to the circuitry, wherein the open state is associated with a sleep mode and the closed state is associated with an active mode, wherein the protection circuit protects the electronic device when a power supply voltage is out of range; and
    a voltage detector in the circuitry that senses the battery voltage, wherein the circuitry is configured to:
       open the switch in the protection circuit to electrically isolate the input whenever the voltage detector senses that the battery voltage exceeds a first threshold voltage so that the power converter detects an absence of output loading and, in response to the detection of the absence of output loading, the power converter enters into the sleep mode; and
       close the switch in the protection circuit to electrically connect the input to the circuitry whenever the voltage detector senses that the battery voltage has fallen below a second threshold so that the power converter detects a presence of output loading and, in response to the detection of the presence of output loading, the power converter enters into the active mode, wherein the second threshold voltage is lower than the first threshold voltage.

14. The electronic device defined in claim 13 wherein the circuitry is further configured to open the switch in the protection circuit when the power supply voltage is out of range.

15. The electronic device defined in claim 14 further comprising a charging circuit that receives power from the input when the switch is closed and that charges the battery.

16. The electronic device defined in claim 13 further comprising a charging circuit that receives power from the input when the switch is closed and that charges the battery.

17. The electronic device defined in claim 13 further comprising a display that displays a fixed battery charge status indicator while the battery voltage fluctuates within a range above the second threshold.

18. The electronic device defined in claim 13 further comprising:
    an input connector at the input, wherein the input connector has a plurality of contacts, wherein the input connector is configured to receive power from a power converter that is connected to at least some of the contacts; and communications circuitry in the circuitry that transmits digital data signals to the power converter though the contacts.

19. A method for operating a system that includes an electronic device with a connector and that includes a power converter that is sometimes connected to the connector and that is sometimes disconnected from the connector, the method comprising:
- whenever the power converter is disconnected from the connector, using load detection circuitry in the power converter to detect an absence of an output load in the power converter and, in response to detection of the absence of the output load, placing the power converter in a sleep mode; and
- whenever the power converter is connected to the electronic device periodically electrically isolating circuitry in the electronic device from the connector to which the power converter is connected while powering the circuitry with a battery,
  - wherein periodically electrically isolating the circuitry in the electronic device from the connector comprises:
  - periodically opening a switch in a protection circuit in the electronic device to isolate the circuitry from the connector when the battery has a voltage above a given threshold voltage, wherein the protection circuit protects the electronic device when a power supply voltage is out of range.

20. The method defined in claim 19, wherein the switch in the protection circuit is coupled to an input-output port in the electronic device.

* * * * *

UNITED STATES PATENT AND TRADEMARK OFFICE
CERTIFICATE OF CORRECTION

PATENT NO. : 8,830,073 B2  Page 1 of 1
APPLICATION NO. : 12/628976
DATED : September 9, 2014
INVENTOR(S) : Nicholas A. Sims et al.

It is certified that error appears in the above-identified patent and that said Letters Patent is hereby corrected as shown below:

In the Claims:

Column 17, line 1 (Claim 4, line 1): "claim 1" should read --claim 3--.

Column 17, line 23 (Claim 5, line 19): "the sleep" should read --a sleep--.

Column 17, line 33 (Claim 5, line 29): "the active" should read --an active--.

Column 17, line 62 (Claim 8, line 20): "an output" should read --the output--.

Column 17, line 64 (Claim 8, line 22): "low power" should read --low-power--.

Column 18, line 36 (Claim 13, line 18): "the power" should read --a power--.

Column 18, line 43 (Claim 13, line 25): "threshold so that" should read --threshold voltage so that--.

Signed and Sealed this
Twenty-fourth Day of February, 2015

Michelle K. Lee
*Deputy Director of the United States Patent and Trademark Office*